(12) United States Patent
Ando

(10) Patent No.: US 11,874,908 B2
(45) Date of Patent: Jan. 16, 2024

(54) BIOMETRIC AUTHENTICATION SYSTEM, CONTROL DEVICE, AND NON-TRANSITORY COMPUTER READABLE MEDIUM

(71) Applicant: KABUSHIKI KAISHA TOKAI RIKA DENKI SEISAKUSHO, Aichi (JP)

(72) Inventor: Takahiko Ando, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 70 days.

(21) Appl. No.: 17/152,101

(22) Filed: Jan. 19, 2021

(65) Prior Publication Data

US 2021/0232671 A1    Jul. 29, 2021

(30) Foreign Application Priority Data

Jan. 24, 2020    (JP) .................................. 2020-010027

(51) Int. Cl.
  *G06F 21/32*    (2013.01)
(52) U.S. Cl.
  CPC .................................. *G06F 21/32* (2013.01)
(58) Field of Classification Search
  None
  See application file for complete search history.

(56) References Cited

U.S. PATENT DOCUMENTS

| 7,007,298 | B1* | 2/2006 | Shinzaki | G06F 21/32 |
| | | | | 713/186 |
| 2002/0126882 | A1* | 9/2002 | Funahashi | G06V 40/1365 |
| | | | | 382/124 |
| 2014/0237587 | A1* | 8/2014 | Forbes | G06F 21/32 |
| | | | | 726/18 |
| 2016/0315936 | A1 | 10/2016 | Berini et al. | |
| 2017/0076080 | A1 | 3/2017 | Hao et al. | |

(Continued)

FOREIGN PATENT DOCUMENTS

| CN | 107585201 A | 1/2018 |
| CN | 109416733 A | 3/2019 |

(Continued)

OTHER PUBLICATIONS

Office Action from Japan Patent Office (JPO) in Japanese Patent Appl. No. 2020-010027, dated Sep. 26, 2023, together with an English language translation.

*Primary Examiner* — Nicholas J Lee
(74) *Attorney, Agent, or Firm* — GREENBLUM & BERNSTEIN, P.L.C.

(57) ABSTRACT

A biometric authentication system includes: a storage device that stores pieces of biometric information and pieces of registered information associated with the respective pieces of the biometric information and identifying the respective pieces of the biometric information; an acquisition device that acquires the biometric information of a user to be authenticated; and a control device that is configured to cause a notification device, when the biometric information acquired by the acquisition device matches a piece of the biometric information stored in the storage device, to notify of a piece of the registered information associated with the matched piece of the biometric information.

6 Claims, 3 Drawing Sheets

(56) References Cited

U.S. PATENT DOCUMENTS

| | | |
|---|---|---|
| 2017/0323091 A1 | 11/2017 | Okabayashi |
| 2018/0330068 A1 | 11/2018 | Mori |
| 2020/0114931 A1 | 4/2020 | Rao et al. |
| 2021/0009081 A1 | 1/2021 | Wang et al. |
| 2022/0032875 A1 | 2/2022 | Wang et al. |

FOREIGN PATENT DOCUMENTS

| | | |
|---|---|---|
| CN | 110481504 A | 11/2019 |
| CN | 209921261 U | 1/2020 |
| JP | 2004-042793 A | 2/2004 |
| JP | 2007-310639 | 11/2007 |
| JP | 2008-062690 A | 3/2008 |
| JP | 2009-211487 A | 9/2009 |
| JP | 2009-301460 A | 12/2009 |
| JP | 2016-130977 A | 7/2016 |
| JP | 2018-190354 A | 11/2018 |
| KR | 101556943 B1 | 10/2015 |

\* cited by examiner

BIOMETRIC AUTHENTICATION SYSTEM, CONTROL DEVICE, AND NON-TRANSITORY COMPUTER READABLE MEDIUM

CROSS REFERENCE TO RELATED APPLICATIONS

This application claims priority to Japanese Patent Application No. 2020-010027 filed on Jan. 24, 2020, the content of which is incorporated herein by reference.

TECHNICAL FIELD

The present invention relates to a biometric authentication system. The present invention relates to a control device used in the biometric authentication system and a non-transitory computer readable medium storing computer program executed by the control device.

BACKGROUND ART

JP 2008-62690 A discloses an anti-theft device that allows only a specific person to cancel the security function of the vehicle. The anti-theft device reads a fingerprint, which is biometric information of a person who intends to start the engine of the vehicle, and enables the engine of the vehicle to be started when the read fingerprint matches a pre-registered fingerprint. If the vehicle is used by a plurality of users, the fingerprint information of the plurality of users can be registered. In addition, each user can register fingerprint information for a plurality of fingers.

SUMMARY OF INVENTION

In a situation where a plurality of pieces of fingerprint information have been registered, the user may want to confirm which registered information is assigned to his/her specific finger.

An object of the present invention is to make it possible to confirm pieces of the registered information associated with respective pieces of the registered biometric information.

According to an aspect of the present invention, a biometric authentication system includes: a storage device that stores pieces of biometric information and pieces of registered information associated with the respective pieces of the biometric information and identifying the respective pieces of the biometric information; an acquisition device that acquires the biometric information of a user to be authenticated; and a control device that is configured to cause a notification device, when the biometric information acquired by the acquisition device matches a piece of the biometric information stored in the storage device, to notify of a piece of the registered information associated with the matched piece of the biometric information.

According to another aspect of the present invention, a control device includes: a receiving unit configured to receive biometric information of a user to be authenticated; and a processing unit configured to cause a notification device, when the biometric information received by the receiving unit matches the biometric information stored in a storage device, to notify of registered information stored in the storage device in association with the matched biometric information and identifying the matched biometric information.

According to another aspect of the present invention, a non-transitory computer-readable medium storing computer-executable instructions that, when executed by a processing unit of a control device, control the control device to receive biometric information of a user to be authenticated, and to cause a notification device, when the received biometric information matches the biometric information stored in a storage device, to notify of registered information stored in the storage device in association with the matched biometric information and identifying the matched biometric information.

The identification of the registered biometric information may have to rely on the registered information associated with the biometric information. However, in a situation where pieces of the biometric information are registered, it may be difficult for the user to identify a piece of the registered information to which user's biometric information corresponds relying on user's memory. According to the above configuration, if user's biometric information is registered in advance, the piece of the registered information associated with user's biometric information can be confirmed. This makes it possible to suppress the occurrence of a situation in which unintended editing of the biometric information is performed. Examples of unintended editing of the biometric information include duplicate registration of the same piece of the biometric information, deletion of other piece of the biometric information, and deletion of a piece of the biometric information of other users who share the moving body or device to which biometric authentication is applied.

DESCRIPTION OF EMBODIMENTS

Figure 1:
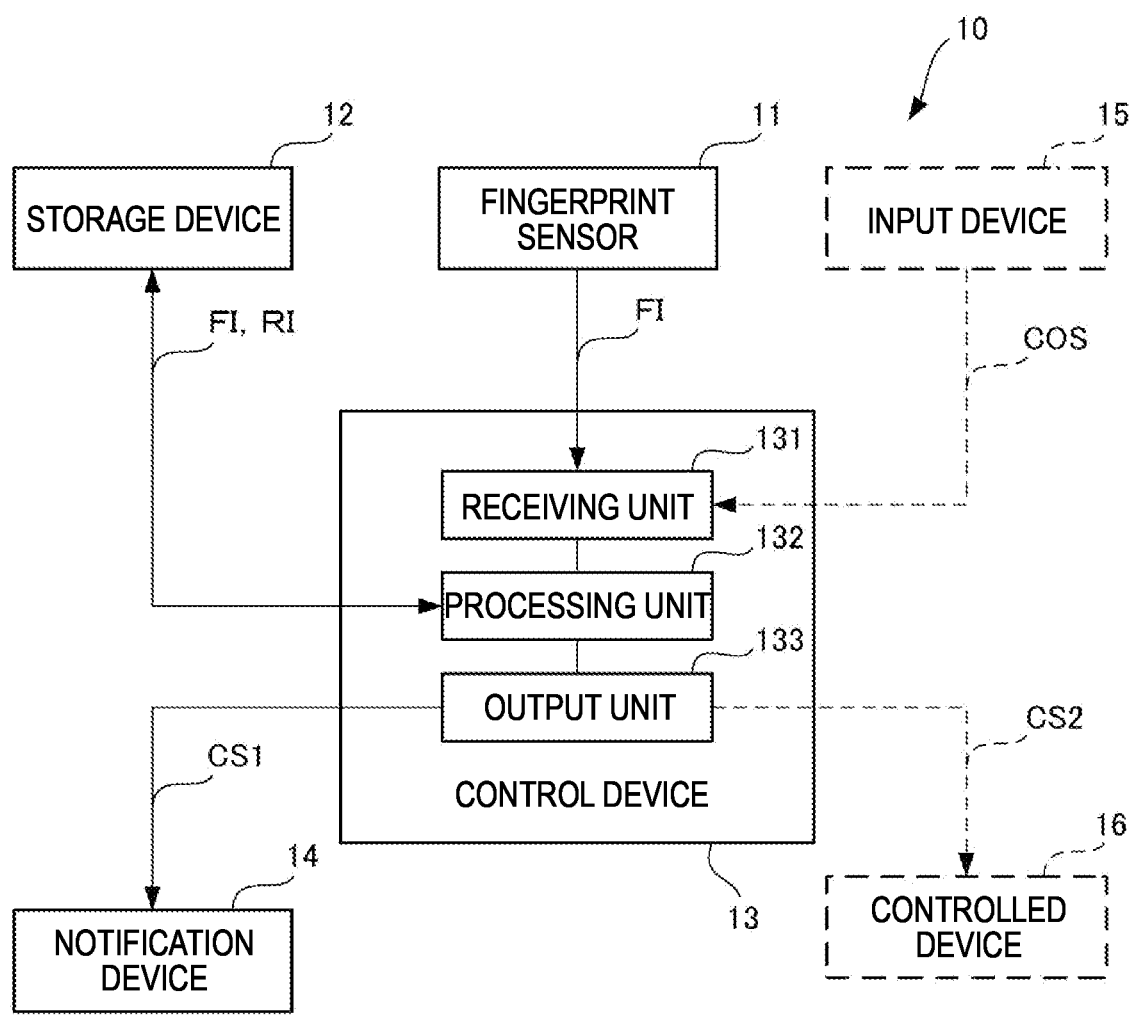
FIG. 1 illustrates a functional configuration of a biometric authentication system according to an embodiment.

An example of the embodiment will be described in detail below with reference to the accompanying drawings. FIG. 1 illustrates a configuration of a biometric authentication system 10 according to an embodiment. The biometric authentication system 10 is used, for example, to authenticate a user of a vehicle 20 illustrated in FIG. 2 and allow the user to use the vehicle 20.

Figure 2:
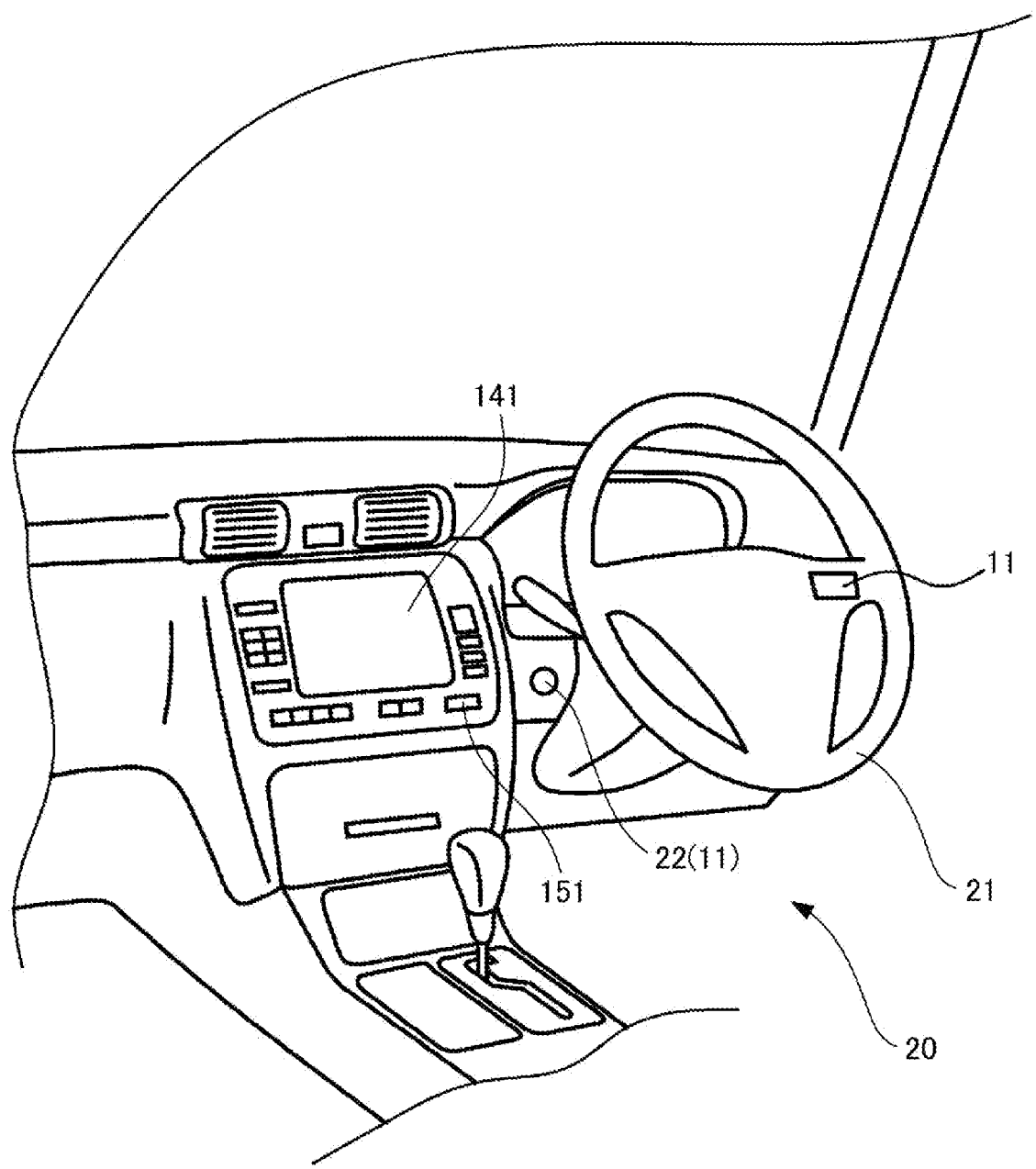
FIG. 2 shows an example in which the biometric authentication system of FIG. 1 is applied to a vehicle.

The biometric authentication system 10 includes a fingerprint sensor 11. The fingerprint sensor 11 is configured to acquire fingerprint information FI of a person to be authenticated. Fingerprint information FI is an example of biometric information. The fingerprint sensor 11 is an example of an acquisition device. The fingerprint sensor 11 can be arranged at an appropriate position on the vehicle 20. For example, the fingerprint sensor 11 may be provided on the steering wheel 21 of the vehicle 20, as shown in FIG. 2. Alternatively, the fingerprint sensor 11 can be installed in a car dealer's store.

The fingerprint information FI can be acquired based on the charge distribution on the surface of the finger, the distribution of the reflection intensity of light or ultrasonic waves from the surface of the finger, and the like. Since these techniques are well known, the detailed description thereof will be omitted. The fingerprint sensor 11 outputs the acquired fingerprint information FI. The fingerprint information FI may be in the form of analog data or digital data.

The biometric authentication system 10 includes a storage device 12. The storage device 12 can be arranged at an appropriate position on the vehicle 20. The storage device 12 is a device configured to store pieces of the fingerprint information FI. The pieces of the fingerprint information FI can be fingerprint information acquired from a plurality of fingers of one user who uses the vehicle 20. Alternatively, the pieces of the fingerprint information FI can be fingerprint information acquired from at least one finger of each of users sharing the vehicle 20.

The biometric authentication system 10 includes a control device 13. The control device 13 can be arranged at an appropriate position on the vehicle 20. The control device 13 includes a receiving unit 131, a processing unit 132, and an output unit 133. The receiving unit 131 is configured as an interface for receiving the fingerprint information FI. When the fingerprint information FI is in the form of analog data, the receiving unit 131 can include an appropriate conversion circuit including an A/D converter. The processing unit 132 processes the fingerprint information FI, which is the form of digital data.

The processing unit 132 is configured to be able to execute a process of storing the fingerprint information FI received by the receiving unit 131 in the storage device 12. The fingerprint is registered by storing the fingerprint information FI in the storage device 12. The processing unit 132 is configured to associate registered information RI that identifies the fingerprint information FI when the fingerprint information FI is stored in the storage device 12. An example of the registered information RI is a registration number that is automatically assigned. That is, in addition to the pieces of the fingerprint information FI, the storage device 12 can store pieces of the registered information RI that are associated with the respective pieces of the fingerprint information FI and identify the respective pieces of the fingerprint information FI.

The processing unit 132 is configured to be able to execute a process of reading or referring to the fingerprint information FI and the registered information RI stored in the storage device 12. A person to be authenticated causes the fingerprint sensor 11 to acquire his/her own fingerprint information FI. The processing unit 132 collates the fingerprint information FI acquired by the fingerprint sensor 11 with the fingerprint information FI stored in the storage device 12. The processing unit 132 establishes the authentication if the matching degree between the two exceeds a threshold. In other words, the processing unit 132 authenticates the person to be authenticated who has caused the fingerprint sensor 11 to acquire his/her fingerprint information as a registered user if the matching degree between the two exceeds the threshold. In the following description, "the case where the matching degree of both pieces of fingerprint information exceeds the threshold" is simply described as "the case where both pieces of fingerprint information match".

The biometric authentication system 10 includes a notification device 14. For example, as shown in FIG. 2, the notification device 14 can be realized as a display device 141 mounted on the center cluster of the vehicle 20.

The processing unit 132 is configured to cause the notification device 14, when the processing unit 132 determines that the fingerprint information FI acquired by the fingerprint sensor 11 matches the fingerprint information FI stored in the storage device 12, to notify of the registered information RI stored in the storage device 12 in association with the fingerprint information FI. Specifically, the processing unit 132 generates a control signal CS1 for controlling the notification device 14 and outputs the control signal CS1 from the output unit 133. The control signal CS1 may be a digital signal or an analog signal. When the control signal CS1 is an analog signal, the output unit 133 can include an appropriate conversion circuit including a D/A converter.

The notification device 14 is configured to notify the registered information RI, which is associated with the fingerprint information FI confirmed as matching, based on the control signal CS1. For example, when it is determined that the fingerprint information FI acquired by the fingerprint sensor 11 matches the fingerprint information FI stored in the storage device 12, the registration number as the registered information RI associated with the fingerprint information FI is displayed on the display device 141.

An example of the flow of processing performed by the processing unit 132 of the control device 13 configured as described above will be described with reference to FIGS. 1 and 3.

First, the processing unit 132 acquires the fingerprint information FI of a user to be authenticated from the fingerprint sensor 11 through the receiving unit 131 (STEP 11).

Subsequently, the processing unit 132 determines whether the fingerprint information FI that matches the fingerprint information FI acquired by the fingerprint sensor 11 is stored in the storage device 12 (STEP 12).

If it is determined that the fingerprint information FI matching the fingerprint information FI acquired by the fingerprint sensor 11 is stored in the storage device 12 (YES in STEP 12), the processing unit 132 causes the notification device 14 to notify of the registered information RI associated with the fingerprint information FI stored in the storage device 12 (STEP 13).

It is difficult to immediately distinguish each fingerprint from other fingerprints from its appearance. Therefore, the identification of the registered fingerprint information has to rely on the registered information associated with the fingerprint information. However, in a situation where pieces of the fingerprint information are registered, it may be difficult for the user to identify a piece of the registered information to which user's fingerprint corresponds by relying on user's memory. According to the above configuration, if user's fingerprint information is registered in advance, the piece of the registered information associated with user's fingerprint information can be confirmed. This makes it possible to suppress the occurrence of a situation in which unintended editing of the fingerprint information is performed. Examples of unintended editing of the fingerprint information include duplicate registration of the same piece of the fingerprint information, deletion of a piece of the fingerprint information of another finger, and deletion of a piece of the fingerprint information of another user sharing the vehicle 20.

If it is determined that the fingerprint information FI matching the fingerprint information FI acquired by the fingerprint sensor 11 is not stored in the storage device 12 (NO in STEP 12), the processing unit 132 causes the notification device 14 to notify that the fingerprint information acquired by the fingerprint sensor 11 is not registered (STEP 14). With such a configuration, the user can confirm which finger's fingerprint of the user is unregistered. Instead of the notification relating to STEP 14, the process may be returned to STEP 11.

The biometric authentication system 10 can include an input device 15. The input device 15 is configured to receive an input of a confirmation instruction, which is an instruction for confirming the registered information RI. When the input device 15 receives an input of a confirmation instruction, the input device 15 outputs a confirmation signal COS corresponding to the confirmation instruction. For example, as shown in FIG. 2, the input device 15 can be realized by an operation button 151 mounted on the center cluster of the vehicle 20.

Figure 3:
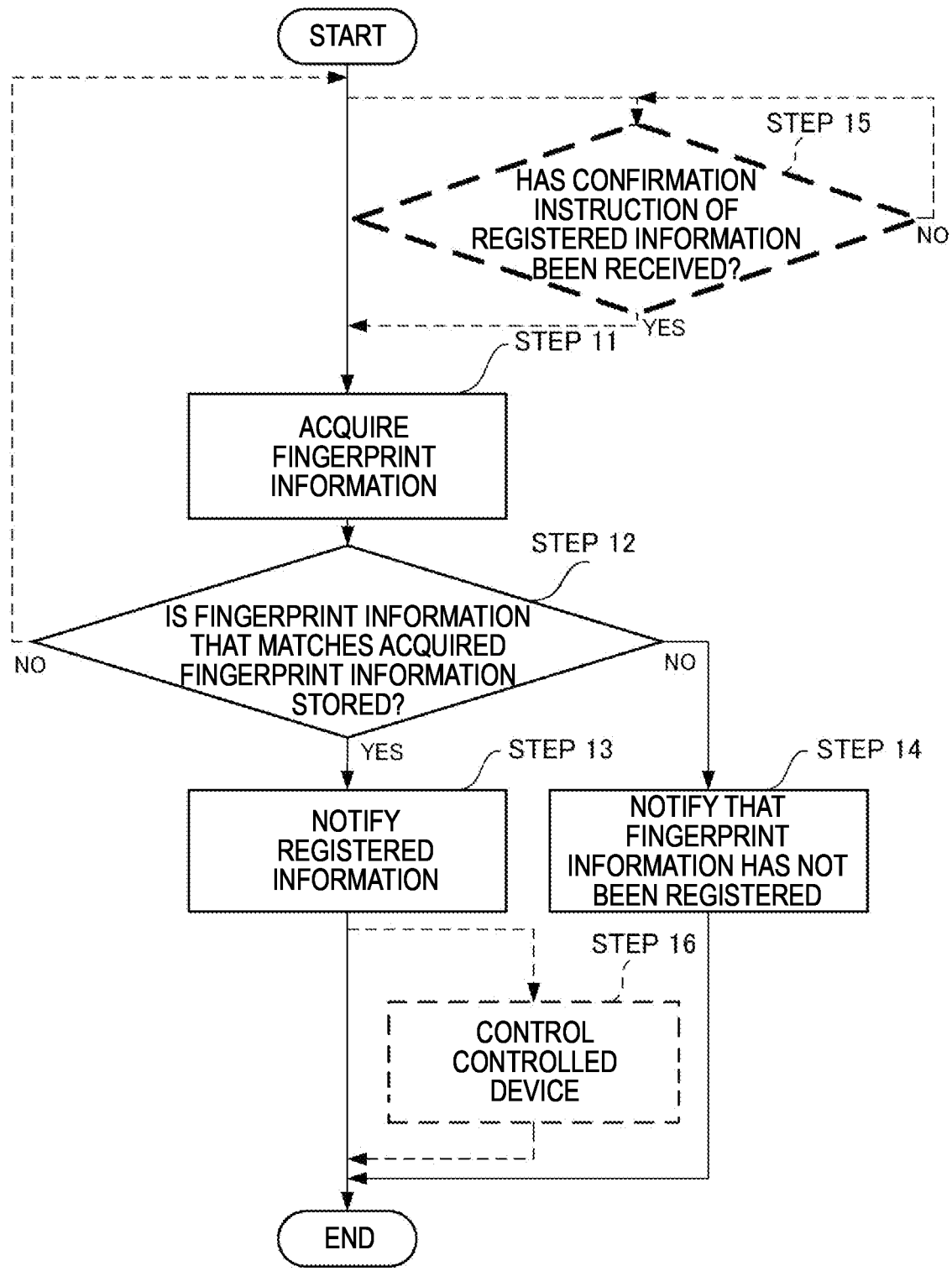
FIG. 3 shows an example of a processing flow executed by the control device of FIG. 1.

In this case, as illustrated in FIG. 3, the processing unit 132 determines whether or not the confirmation instruction of the registered information has been received (STEP 15). The process of STEP 15 is repeated until the confirmation instruction of the registered information is received (NO in STEP 15).

If it is determined that the confirmation instruction of the registered information has been received (YES in STEP 15), the processing unit 132 performs the registered information confirmation process. That is, the processing unit 132 acquires the fingerprint information of the user to be authenticated through the receiving unit 131 (STEP 11). Then, the processing unit 132 performs the processes after STEP 12 as described above.

According to such a configuration, the user can confirm the registered information RI associated with the registered fingerprint information FI as a response to the instruction input to the input device 15. This can improve convenience of a user who feels annoyed that the registered information RI is notified each time touching the fingerprint sensor 11.

The biometric authentication system 10 can include a device 16 to be controlled. The controlled device 16 is configured to perform a predetermined function. When the fingerprint information FI acquired by the fingerprint sensor 11 matches the fingerprint information FI stored in the storage device 12, the processing unit 132 of the control device 13 causes the output unit 133 to output a control signal CS2 for operating the controlled device 16. The controlled device 16 executes a predetermined function based on the control signal CS2. For example, the controlled device 16 can be realized as an engine to be started by an ignition button. In this case, the fingerprint sensor 11 can be built into the ignition button 22 of the vehicle 20, as shown in FIG. 2.

For example, the user of the vehicle 20 touches the ignition button 22 with a finger whose fingerprint information is registered in order to start the engine. The processing unit 132 acquires user's fingerprint information FI acquired by the fingerprint sensor 11 through the receiving unit 131 (STEP 11 in FIG. 3).

When it is determined that the fingerprint information FI acquired by the fingerprint sensor 11 matches the fingerprint information FI stored in the storage device 12 (YES in STEP 12), the processing unit 132 causes the notification device 14 to notify of the registered information RI associated with the matched fingerprint information FI (STEP 13). In addition, the processing unit 132 operates the controlled device 16 (STEP 16). For example, the engine, which is the controlled device 16, is started based on the control signal CS2. The timing of operating the controlled device 16 may be before notifying the registered information RI.

According to such a configuration, the user can control the operation of the controlled device 16 and confirm the registered information RI in one operation.

Other examples of the controlled device 16 include a locking device, an air conditioner, and the like in the vehicle 20. In this case, the fingerprint sensor 11 can be a fingerprint sensor provided on a doorknob of the vehicle 20 or an operation button provided on the air conditioner of the vehicle. The control signal CS2 can be a signal for causing the locking device of the vehicle 20 to unlock, a signal for operating the air conditioner of the vehicle 20, or the like.

The processing unit 132 having each function described so far can be realized by a general-purpose microprocessor that operates in cooperation with a general-purpose memory. Examples of the general-purpose microprocessors include a central processing unit (CPU), a micro processing unit (MPU), and a graphics processing unit (GPU). Read only memory (ROM) and random access memory (RAM) can be exemplified as the general-purpose memory. In this case, the ROM can store a computer program that executes the above-described processing. The ROM is an example of a storage medium that stores a computer program. The processor specifies at least a part of a computer program stored in the ROM, loads the program on the RAM, and performs the above-described processing in cooperation with the RAM. The above computer program may be pre-installed in the general-purpose memory or may be downloaded from an external server via a communication network and installed in the general-purpose memory. In this case, the external server is an example of a storage medium that stores a computer program.

The processing unit 132 may be realized by a dedicated integrated circuit capable of executing the above computer programs, such as a microcontroller, an application specific integrated circuit (ASIC), and a field-programmable gate array (FPGA). In this case, the above computer program is pre-installed in a storage element included in the dedicated integrated circuit. The storage element is an example of the storage medium that stores a computer program. The processing unit 132 can also be realized by a combination of a general-purpose microprocessor and a dedicated integrated circuit.

The storage device 12 is realized by a semiconductor memory or a hard disk drive (HDD). The storage device 12 may be realized as a general-purpose memory of the control device 13.

The above embodiment is merely an example for facilitating the understanding of the present invention. The configuration according to the above embodiment can be appropriately changed or improved without departing from the spirit of the present invention.

The registered information RI can include identification information for identifying the user to be authenticated in addition to or instead of the registration number. For example, the user can appropriately set the identification information when registering the fingerprint information FI used for authentication. The device for inputting the identification information may be the input device 15 or may be a device different from the input device 15. Examples of the identification information include the names of users and fingers. According to such a configuration, the user owning the registered fingerprint information FI can be identified by the registered information RI, and thus, it is possible to more reliably suppress the occurrence of a situation where the fingerprint information FI of another user sharing the vehicle 20 is edited unintentionally.

In the above embodiment, fingerprint information is acquired as biometric information of a user to be authenticated. However, as biometric information, vein information, voiceprint information (voice authentication), face information, iris information, and the like may be acquired. Face information and iris information can be acquired using, for example, an imaging device such as a camera or an image sensor. Voiceprint information can be acquired using, for example, a voice input device such as a microphone. Vein information can be acquired using, for example, a vein sensor using near-infrared rays. The biometric information stored in the storage device 12 may be of a plurality of types.

In the above embodiment, the notification device 14 is realized by the display device 141. However, the notification device 14 can be realized by a transparent display device or the like built in the window of the vehicle 20. The notification device 14 can be realized by a voice output device such as a speaker that notifies by outputting a notification voice in addition to or instead of the above-mentioned example using the display device 141 or the transparent display.

In the above embodiment, the input device 15 is realized by the operation button 151. However, the input device 15 may be realized by causing at least a part of the display device 141 to function as a touch sensor. The input device 15 can be realized by a voice input device such as a microphone that receives a user's voice or an imaging device such as a camera that receives a user's gesture, in addition to or instead of the example using the operation button 151 and the display device 141. Further, the input device 15 may function as the fingerprint sensor 11. For example, the input device 15 can be configured to function as the fingerprint sensor and can be configured to output a confirmation signal COS together with the fingerprint information FI when the fingerprint information is acquired by the fingerprint sensor.

In the above embodiment, the biometric authentication system 10 authenticates the user of the vehicle 20. However, the biometric authentication system 10 can be used to authenticate users of moving bodies other than the vehicle 20. Examples of such moving bodies include railroads, aircraft, ships, and the like. The moving body does not have to require a driver. The biometric authentication system 10 can be used to control the operation of monitoring devices, locking devices, air conditioning devices, lighting devices, audio-visual equipment, and the like in houses and facilities. The biometric authentication system 10 can be used to control the operation such as cancellation of a security function of a mobile terminal such as a smartphone.

The storage device 12 does not necessarily have to be installed in the same moving body, house, facility, or the like as the fingerprint sensor 11 and the notification device 14. The storage device 12 can be provided as an external device capable of communicating with the control device 13 via a communication network.

The control device 13 does not necessarily have to be installed in the same moving body, house, facility, or the like as the fingerprint sensor 11 and the notification device 14. The control device 13 can be provided as an external device capable of communicating with at least one of the fingerprint sensor 11, the storage device 12, the notification device 14, and the input device 15 via a communication network.

What is claimed is:

1. A biometric authentication system, comprising:
   a storage device that stores pieces of biometric information and pieces of registered information associated with the respective pieces of the biometric information and identifying the respective pieces of the biometric information;
   an acquisition device that acquires biometric information of a user to be authenticated; and
   a control device that is configured to cause a notification device, when the biometric information acquired by the acquisition device matches a piece of the biometric information stored in the storage device, to notify of a piece of the registered information associated with the matched piece of the biometric information and identify the matched piece of the biometric information,
   wherein the piece of the registered information is a name of a finger.

2. The biometric authentication system according to claim 1,
   wherein when the control device receives a confirmation instruction for confirming the registered information, the control device determines whether or not the biometric information acquired by the acquisition device matches any of the pieces of the biometric information stored in the storage device.

3. The biometric authentication system according to claim 1,
   wherein the control device causes a device to be controlled to perform a predetermined function when the biometric information acquired by the acquisition device matches the piece of the biometric information stored in the storage device.

4. The biometric authentication system according to claim 1,
   wherein the registered information includes identification information for identifying a user to be authenticated.

5. A control device, comprising:
   a receiver configured to receive biometric information of a user to be authenticated; and
   a processor configured to cause a notification device, when the biometric information received by the receiver matches biometric information stored in a storage device, to notify of registered information stored in the storage device in association with the matched biometric information and identify the matched biometric information,
   wherein the registered information is a name of a finger.

6. A non-transitory computer-readable medium storing computer-executable instructions that, when executed by a processor of a control device, control the control device to:
   receive biometric information of a user to be authenticated, and
   cause a notification device, when the received biometric information matches biometric information stored in a storage device, to notify of registered information stored in the storage device in association with the matched biometric information and identifying the matched biometric information,
   wherein the registered information is a name of a finger.

* * * * *